(12) United States Patent
Satran

(10) Patent No.: US 7,063,489 B2
(45) Date of Patent: *Jun. 20, 2006

(54) TANGENTIAL CUTTING INSERT AND MILLING CUTTER

(75) Inventor: Amir Satran, Kfar Vradim (IL)

(73) Assignee: Iscar Ltd., Tefen (IL)

( * ) Notice: Subject to any disclaimer, the term of this patent is extended or adjusted under 35 U.S.C. 154(b) by 172 days.

This patent is subject to a terminal disclaimer.

(21) Appl. No.: 10/942,855

(22) Filed: Sep. 17, 2004

(65) Prior Publication Data

US 2005/0063792 A1   Mar. 24, 2005

(30) Foreign Application Priority Data

Sep. 24, 2003   (IL) ....................................... 158098

(51) Int. Cl.
  B23B 27/16    (2006.01)
(52) U.S. Cl. ............................ 407/113; 407/42; 407/61
(58) Field of Classification Search ............... 407/113, 407/114, 42, 48, 61, 62; B23B 27/16
See application file for complete search history.

(56) References Cited

U.S. PATENT DOCUMENTS

| 2,870,523 | A | * | 1/1959 | Richard | 407/6 |
| 3,490,117 | A | * | 1/1970 | Hertel | 407/104 |
| 3,694,876 | A | * | 10/1972 | Erkfritz | 407/48 |
| 4,074,949 | A | * | 2/1978 | Hochmuth et al. | 407/114 |
| 4,111,589 | A | * | 9/1978 | Goeke | 407/114 |
| 4,294,566 | A | * | 10/1981 | Boone | 407/114 |
| 5,333,972 | A | * | 8/1994 | Bernadic et al. | 407/113 |
| 5,383,750 | A | * | 1/1995 | Satran et al. | 407/113 |
| 6,142,716 | A | * | 11/2000 | Jordberg et al. | 407/114 |
| 6,503,028 | B1 | * | 1/2003 | Wallstrom | 407/35 |
| 6,872,034 | B1 | * | 3/2005 | Satran et al. | 407/113 |
| 6,921,233 | B1 | * | 7/2005 | Duerr et al. | 407/34 |
| 2003/0170080 | A1 | * | 9/2003 | Hecht | 407/113 |
| 2004/0022590 | A1 | * | 2/2004 | Satran et al. | 407/40 |
| 2004/0223818 | A1 | * | 11/2004 | Sheffler et al. | 407/48 |
| 2005/0042044 | A1 | * | 2/2005 | Satran et al. | 407/113 |

FOREIGN PATENT DOCUMENTS

| JP | 2001-062624 | 3/2001 |
| WO | WO 96/35536 | 11/1996 |
| WO | WO 97/17157 | 5/1997 |

* cited by examiner

Primary Examiner—Boyer D. Ashley
Assistant Examiner—Sara Addisu
(74) Attorney, Agent, or Firm—Womble Carlyle

(57) ABSTRACT

A tangential milling cutting insert having two identical opposing end surfaces with two identical opposing major side surfaces of a generally isosceles trapezoidal shape and two identical opposing minor side surfaces extending between them is disclosed. Each end surface has a peripheral edge containing cutting edges and four corners of which two diagonally opposed corners are lowered and the other two are raised. Each end surface is provided with an abutment member having an abutment surface. In each cross section of the cutting insert taken in a plane parallel to a minor plane of the cutting insert, the abutment surface is closer to a median plane than a respective leading section of a major cutting edge.

20 Claims, 14 Drawing Sheets

US 7,063,489 B2

TANGENTIAL CUTTING INSERT AND MILLING CUTTER

FIELD OF THE INVENTION

The present invention relates to a tangential indexable cutting insert and a milling cutter for use in metal cutting processes in general and for milling a square shoulder in a workpiece in particular.

BACKGROUND OF THE INVENTION

Tangential cutting inserts, also known as on-edge, or lay down, cutting inserts, are oriented in an insert holder in such a manner that during a cutting operation on a workpiece the cutting forces are directed along a major (thicker) dimension of the cutting insert. An advantage of such an arrangement being that the cutting insert can withstand greater cutting forces than when oriented in such a manner that the cutting forces are directed along a minor (thinner) dimension of the cutting insert.

There is disclosed in EP 0 769 341 a face milling cutter employing a double-sided indexable tangential cutting insert having a prismoidal shape with two opposed generally rectangular rake surfaces connected by side surfaces. The cutting insert has a basic "negative" geometry and therefore in order to provide the necessary clearance between the cutting insert and the workpiece, when mounted in a face-mill, the cutting insert is oriented with a negative axial rake angle. However, negative axial rake angles are disadvantageous, e.g., they have been found to be deficient in cutting applications involving difficult-to-machine materials.

A double-sided indexable tangential cutting insert for a boring tool head is disclosed in U.S. Pat. No. 5,333,972. The insert is provided at each end with a protruding flat island. Each long cutting edge is inclined at an angle of 3° relative to the protruding flat island, defining an "insert axial rake angle". Rearward of each cutting edge is a descending land surface that merges with an increasing incident angle surface to form a chip breaker groove. Each increasing incident angle surface extends from its associated descending land surface to an adjacent island, at either the top or the bottom of the cutting insert. It will be appreciated that the magnitude of the insert axial rake angle is limited for practical reasons. Any increase in the insert axial rake angle will result in an increase in the "vertical" extent of the increasing incident angle surface (see FIG. 3 of U.S. Pat. No. 5,333,972) that will have an adverse effect on chip development and evacuation.

There is disclosed in WO 96/35536 a double-sided indexable tangential cutting insert which when mounted in a face-mill has a positive axial rake angle, even when the necessary clearance between the cutting insert and the workpiece is provided. This cutting insert presents two peripheral cutting edges for a right-hand face mill and two peripheral cutting edges for a left-hand face mill. In a side view (see FIG. 9) the cutting insert is generally rhomboidal in shape. The main cutting edges 10 of each end surface are parallel (see also FIGS. 7 and 8) to each other and to a centrally located protruding abutment member 12. The cutting insert is retained in an insert pocket with the abutment member of a non-operative end surface and an adjacent non-operative relief surface in abutment with respective support surfaces of the insert pocket. The abutment member of the non-operative end surface and the adjacent non-operative relief surface merge at an acute-angled mounting corner. In order to change the axial rake angle of the operative cutting edge, either the insert pocket has to be rotated, or a cutting insert having a mounting corner with a different mounting angle has to be used. In either case, a different milling cutter has to be used. Moreover, the axial rake and relief angles are interdependent and any change in the axial relief angle results in a corresponding change in the relief angle, which is not always desirable.

There is disclosed in a co-pending Israeli application IL 153252 a double—sided indexable tangential cutting insert and milling cutter, which substantially overcomes the above mentioned problems. However, the cutting insert disclosed therein is single handed, i.e., it is either right-handed or left-handed. In some situations it is convenient to have a cutting insert with the properties of the cutting insert disclosed in IL 153252 but which can be used in both right-hand and left-hand milling operations.

SUMMARY OF THE INVENTION

In accordance with the present invention there is provided a tangential cutting insert for use in a milling cutter, comprising two identical opposing end surfaces having a generally rectangular shape in an end view of the cutting insert, a peripheral side surface extending between the two opposing end surfaces, and a peripheral edge formed at the intersection of each end surface and the peripheral side surface, at least two sections of each peripheral edge constituting cutting edges;

the peripheral side surface comprising two opposing major side surfaces having a generally isosceles trapezoidal shape in major side views of the cutting insert, each end surface having four corners, two diagonally opposite raised corners and two diagonally opposite lowered corners, the lowered corners being closer to a median plane M of the cutting insert than the raised corners, the median plane M passing between the two opposing end surfaces of the cutting insert, each end surface being provided with an abutment surface.

In accordance with the present invention, the peripheral side surface of the cutting insert comprises two opposing minor side surfaces generally traverse to the major side surfaces and to the end surfaces, each minor side surface having a general shape of a rectangle with two truncated corners in a minor side view of the cutting insert.

Further in accordance with the present invention, the cutting insert is mirror symmetric with respect to the median plane M.

Preferably, in major side views of the cutting insert, the abutment surface lies on a concave surface.

In accordance with the present invention, the abutment surface comprises three flat portions, two outer flat portions with an inner flat portion therebetween.

Further in accordance with the present invention, each cutting edge comprises a major cutting edge, a minor cutting edge and a corner cutting edge, therebetween. Major, minor, and corner edges are formed at the intersection of the major side surfaces, minor side surfaces and long corner side surfaces, respectively, with each end surface. Each corner cutting edge is associated with a given raised corner; each major cutting edge extends along substantially the whole length of an associated major edge, and each minor cutting edge extends along at least half of the length of an associated minor edge.

In accordance with a first preferred embodiment of the present invention, in an end-view of the cutting insert, two median lines are defined, one for each outer flat portion, the median lines do not overlap and do not lie on a common straight line.

Preferably, the two median lines are parallel.

Further preferably, the two median lines are parallel to the major side surfaces of the cutting insert.

In accordance with a second embodiment of the present invention, in each cross section of the cutting insert, taken in a plane perpendicular to the median plane M of the cutting insert, the abutment surface of a particular end surface is closer to the median plane M than a leading section of one of the major cutting edges of the particular end surface.

There is also provided, in accordance with the present invention, a milling cutter comprising at least one cutting insert and a cutter body having at least one insert pocket in which the at least one cutting insert is retained; the at least one insert pocket comprising adjacent side and rear walls generally transverse to a base, the rear wall being generally convex, the side wall being provided with an axial location surface that abuts a given minor side surface of the at least one cutting insert at a given axial abutment region; the rear wall being provided with two location surfaces, located on either side of a central region of the rear wall; a first of the two location surfaces abuts one of two tangential abutment surfaces located on the abutment surface, a second of the two location surfaces abuts the other one of the two tangential abutment surfaces located on the abutment surface.

In accordance with the present invention, the given axial abutment region is located on a forward region of a radially outer short side surface of a given minor side surface, the forward region being distal the rear wall of the insert pocket.

BRIEF DESCRIPTION OF THE DRAWINGS

For a better understanding, the invention will now be described, by way of example only, with reference to the accompanying drawings in which.

DETAILED DESCRIPTION OF PREFERRED EMBODIMENTS

Figure 1A:
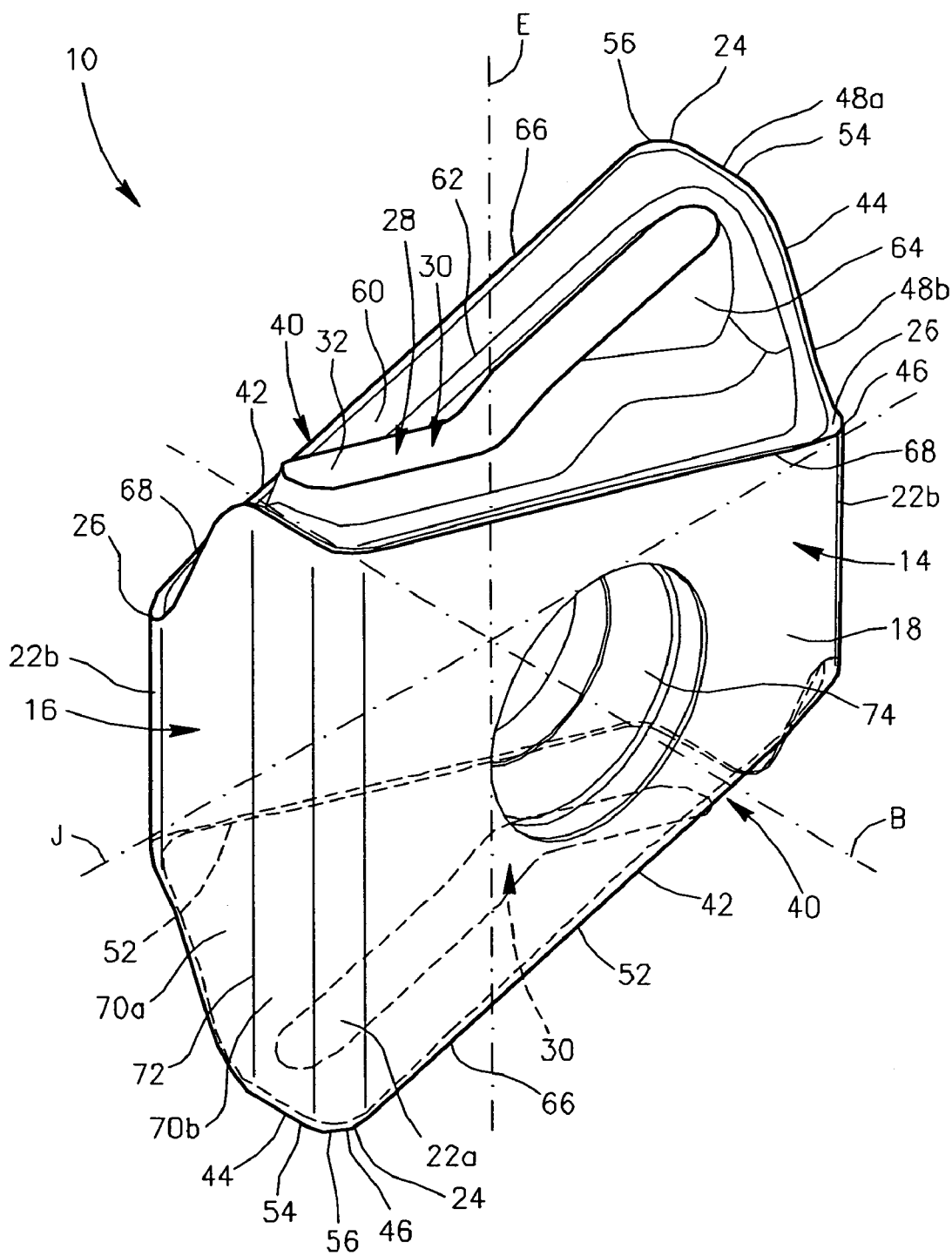
FIG. 1A is a perspective view of a cutting insert in accordance with a first embodiment of the present invention.
Figure 1B:
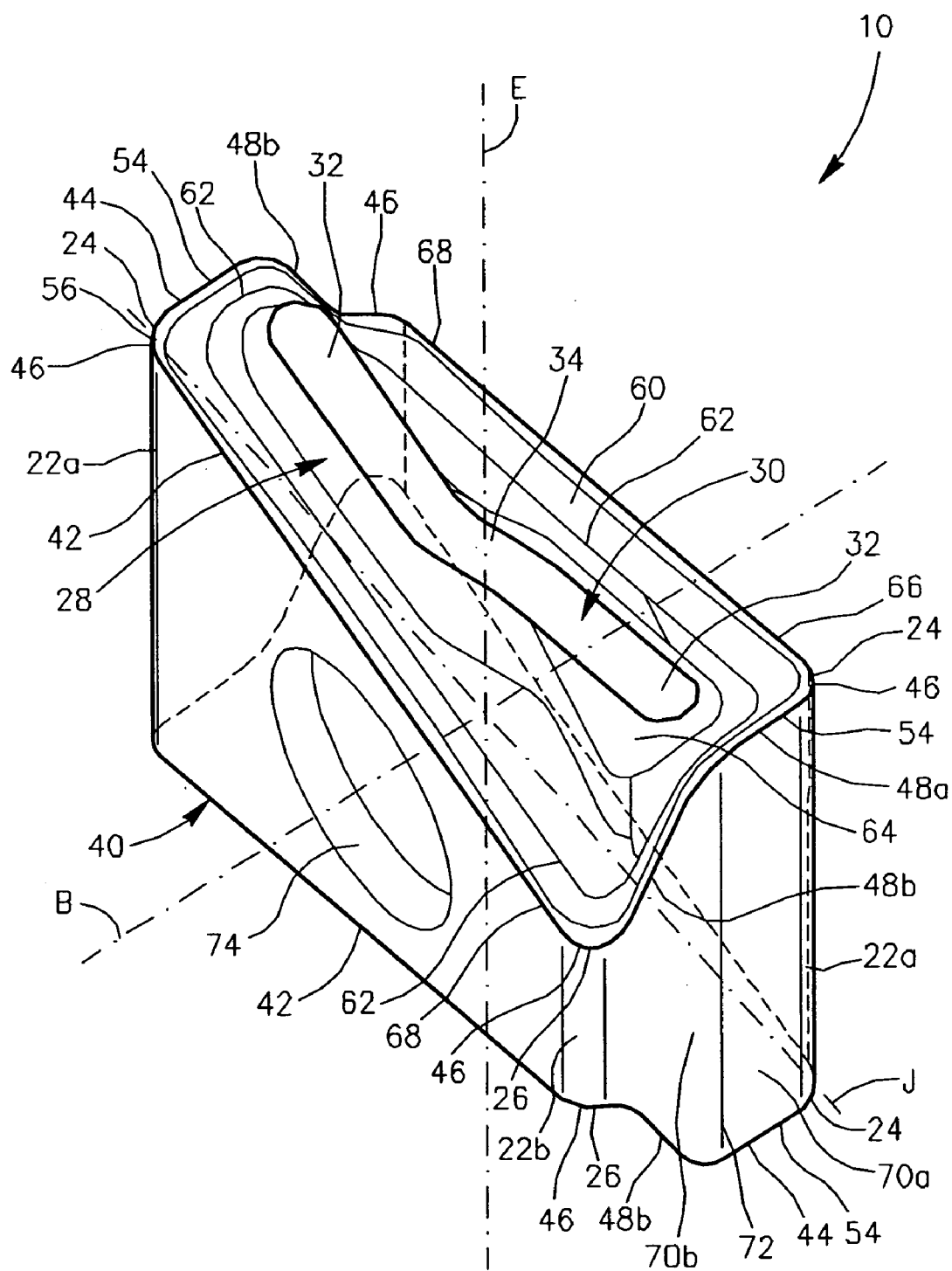
FIG. 1B is an additional perspective view of the cutting insert in FIG. 1.

Attention is first drawn to FIGS. 1 to 5, showing an indexable tangential cutting insert 10 in accordance with a first embodiment of the present invention. The cutting insert 10 is typically manufactured by form-pressing and sintering carbide powders. However, other manufacturing methods, such as injection molding, can be used. The cutting insert 10 is generally rectangular in an end view and has two identical opposing end surfaces 12. Each end surface 12 has 180° rotational symmetry about an axis of symmetry E passing through the two end surfaces 12. The cutting insert 10 is mirror symmetric with respect to a median plane M of the cutting insert 10. The median plane M is perpendicular to the axis of symmetry E and passes between the end surfaces 12.

A peripheral side surface 14 extends between the two opposing end surfaces 12 and comprises two opposed identical minor side surfaces 16, two opposed identical major side surfaces 18, two diagonally opposite long corner side surfaces 22a, and two diagonally opposite short corner side surfaces 22b. Major and minor axes J, B of the cutting insert 10 are defined as being perpendicular to each other and perpendicular to the axis of symmetry E. The axis of symmetry E and the minor axis B define a minor plane P1 of the cutting insert 10. Similarly, the axis of symmetry E and the major axis J define a major plane P2 of the cutting insert. The major plane P2 is parallel to, and located midway between, the two major side surfaces 18 of the cutting insert 10. Adjacent minor and major side surfaces 16, 18 merge at a common corner side surface 22a, 22b. The cutting insert 10 has a first major dimension D1, measured between the end surfaces 12 that is greater than a minor dimension D2 measured between the major side surfaces 18. A second major dimension D3, measured between the minor surfaces 16 is also greater than the minor dimension D2.

Each end surface 12 has four corners, two diagonally opposite raised corners 24 and two diagonally opposite lowered corners 26, the lowered corners 26 being closer to the median plane M than the raised corners 24. Each of the long corner side surfaces 22a extends between a given raised corner 24 of one of the two opposing end surfaces 12 and an opposing raised corner 24 of the other of the two opposing end surfaces 12. Similarly, each of the short corner side surfaces 22b extends between a given lowered corner 26 of one of the two opposing end surfaces 12 and an opposing lowered corner 26 of the other of the two opposing end surfaces 12.

Each end surface 12 is provided with a projecting abutment member 28 having a projecting abutment surface 30, wherein in a major side view of the cutting insert (i.e. a side view of either of the two identical opposed major side surfaces 18) the projecting abutment member 28 is generally concave in form. The projecting abutment surface 30 comprises three generally flat portions, two outer flat portions 32 with an inner flat portion 34 therebetween. Therefore, in a major side view of the cutting insert 10, each projecting abutment surface 30 lies on a concave surface S which is generally V-shaped in form.

Figure 2:
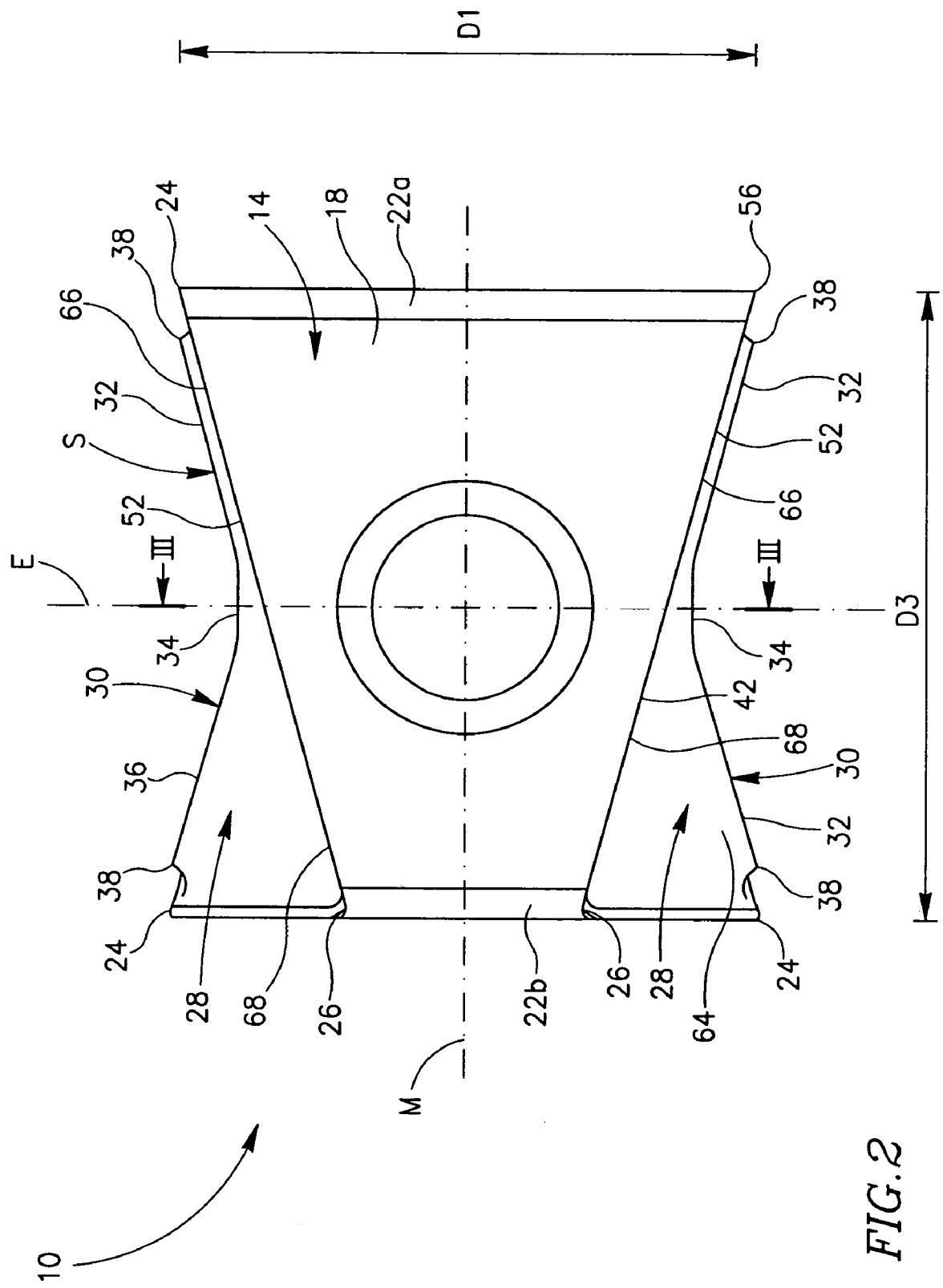
FIG. 2 is a major side view of the cutting insert shown in FIGS. 1A and 1B.
Figure 3:
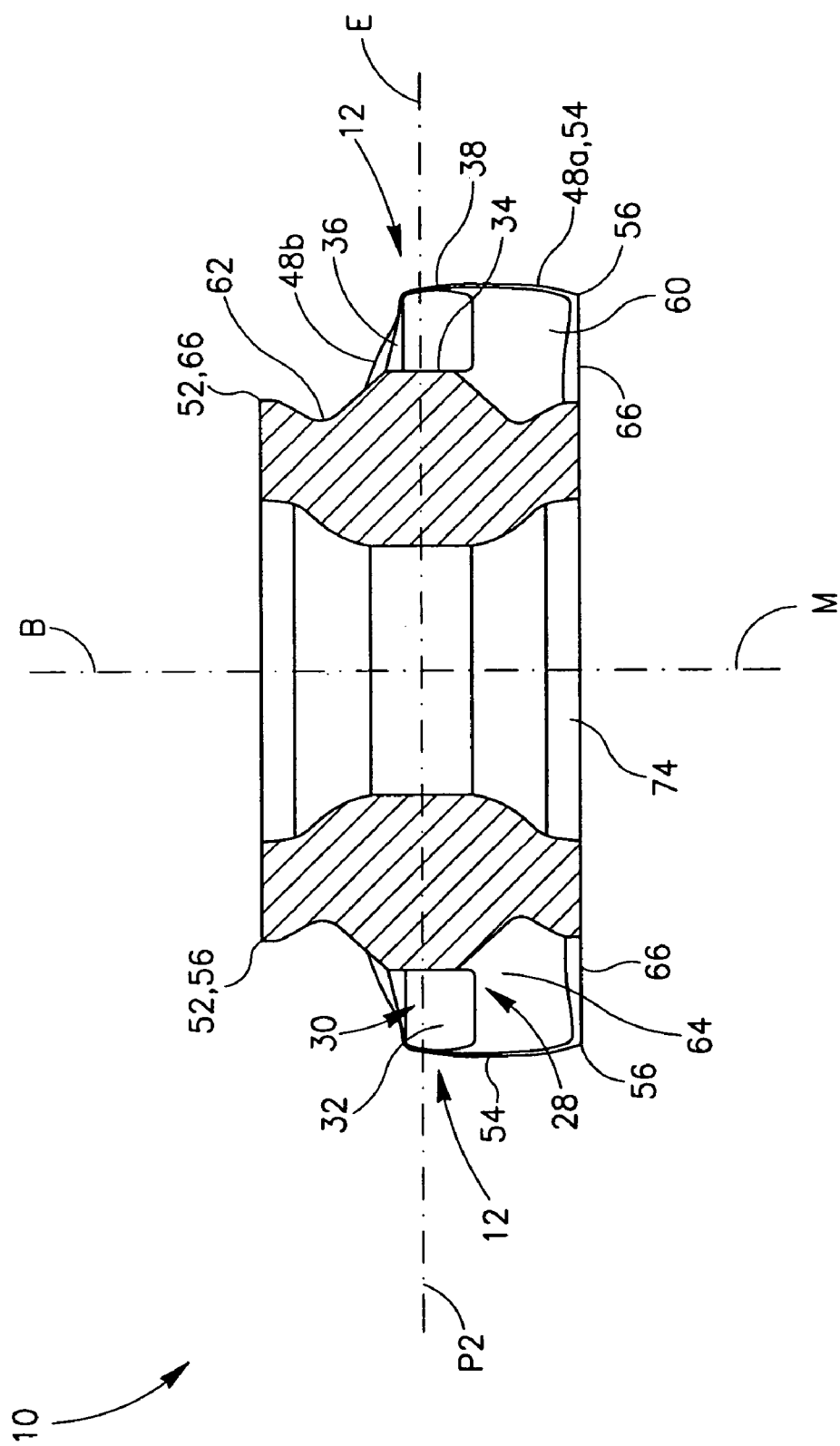
FIG. 3 is a cross sectional view of the cutting insert shown in FIGS. 1A and 1B, taken along the line III—III in FIG. 2.

A peripheral edge 40 is formed at the intersection of each end surface 12 and the peripheral side surface 14. The peripheral edge 40 comprises two major edges 42, formed by the intersection of the major side surfaces 18 with the end surface 12; two minor edges 44, formed by the intersection of the minor side surfaces 16 with the end surface 12; and four corner edges 46, formed by the intersection of either of the long or short corner side surfaces 22a, 22b with the end surface 12. As can be seen in FIG. 2, in a major side view of the cutting insert 10, the major side surface 18 has a general isosceles trapezoidal shape bounded by an opposing pair of major edges 42 and opposing parallel long and short corner side surfaces 22a, 22b.

At least two sections of each peripheral edge 40 of the cutting insert 10 constitute cutting edges 50. Each cutting edge 50 comprises a major cutting edge 52, extending along substantially the whole length of its associated major edge 42; a minor cutting edge 54, extending along at least half of the length of its associated minor edge 44; and a corner cutting edge 56, associated with a raised corner 24 and at which the major and minor cutting edges 52, 54 merge. Adjacent each cutting edge 50 in the end surfaces 12 is a rake surface 60 along which chips that are removed from a workpiece during a milling operation flow. Between the rake surface 60 and the projecting abutment member 28 there is a chip forming groove 62. The portion of the projecting abutment member 28 adjacent the chip forming groove 62 constitutes a chip deflector 64.

Figure 4:
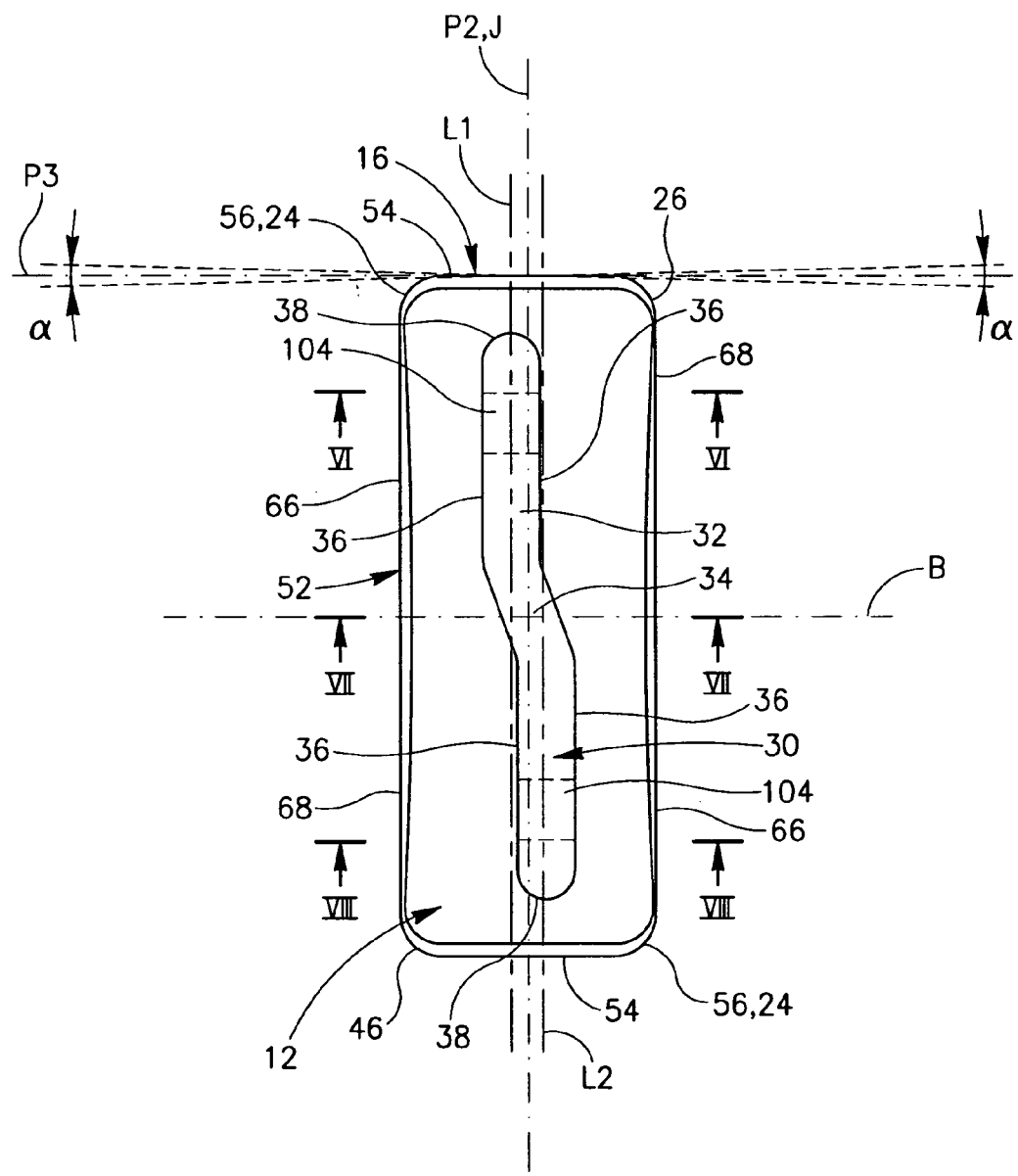
FIG. 4 is an end view of the cutting insert shown in FIGS. 1A and 1B.
Figure 5:
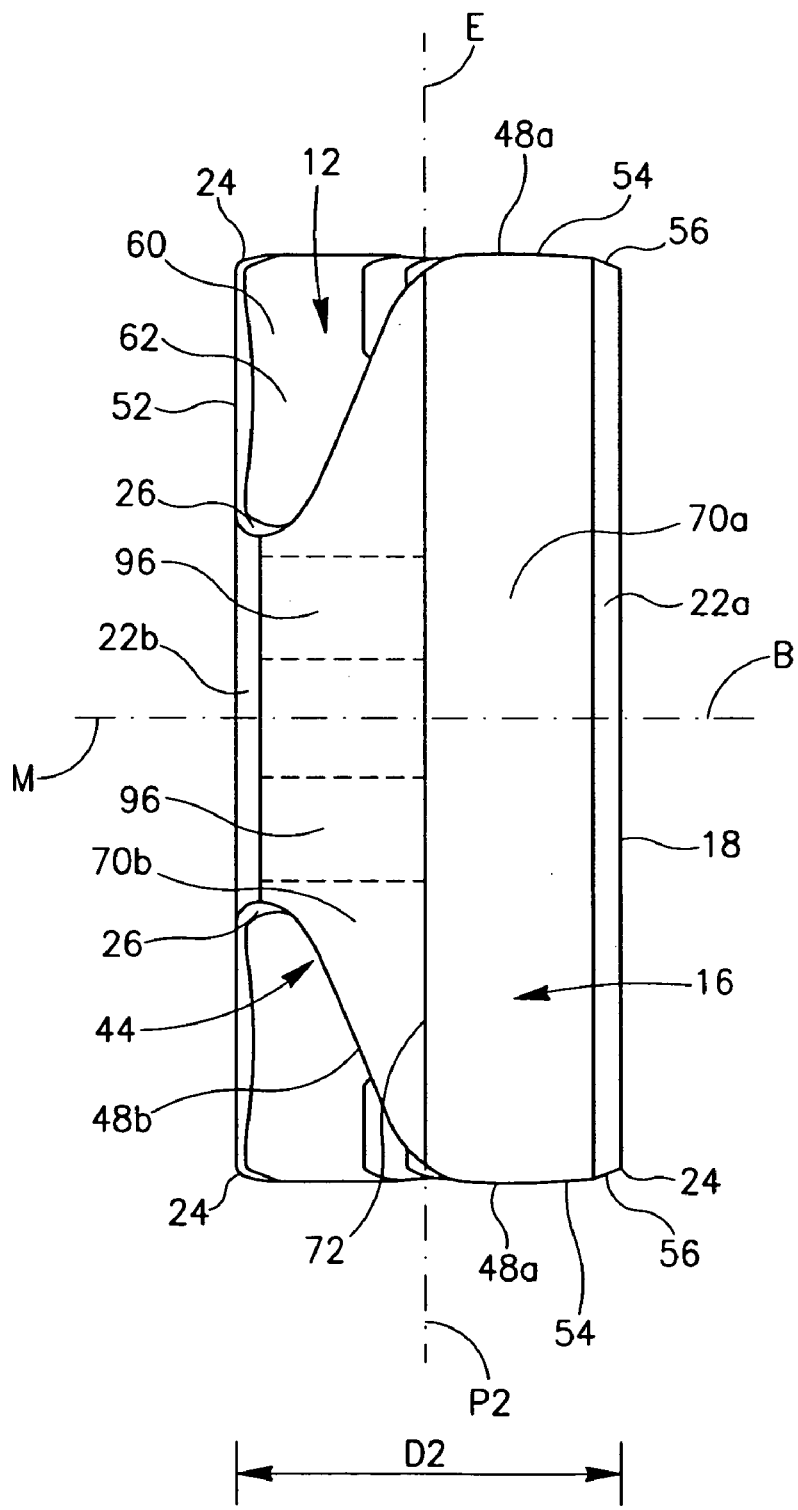
FIG. 5 is a minor side view of the cutting insert shown in FIGS. 1A and 11B.

Referring to FIG. 5, it is seen that each minor side surface 16 has the general shape of a rectangle with two truncated corners and is divided into two minor side sub-surfaces 70a, 70b, a long minor side sub-surface 70a and a short minor side sub-surface 70b, by a join 72 formed by the intersection of the minor side surface 16 by the major plane P2 of the cutting insert 10. The long minor side sub-surface 70a is generally rectangular in shape, whereas the short minor side sub-surface 70b can be considered to being similar to the long minor side sub-surface 70a, but with the two truncated corners. In an end view of the cutting insert 10, each minor side sub-surface 70a, 70b extends away from the join 72 at an angle α with respect to a plane P3 passing through the join 72 and perpendicular to the major plane P2 (see FIG. 4). In accordance with a specific application, the angle α is approximately 1.5°. A through bore 74, having a bore axis which coincides with the minor axis B of the cutting insert 10, extends between the major side surfaces 18.

As will become apparent below, with reference to a milling cutter in accordance with the present invention, a section of the major cutting edge 52 adjacent the raised corner 24 constitutes a leading section 66 of the major cutting edge 52, whereas a section of the major cutting edge 52 adjacent the lowered corner 26 constitutes a trailing section 68 of the major cutting edge 52. As can be seen in FIG. 2, in a major side view of the cutting insert 10, the projecting abutment member 28, in the region of the leading section 66 of the major cutting edge 52 and up to and a little beyond the inner flat portion 34 of the projecting abutment surface 30, does not protrude by much above the major cutting edge 52. Consequently, chips formed in this region during a milling process are almost unaffected by the projecting abutment member 28 and therefore well developed. However, in the region of the trailing section 68 of the major cutting edge 52, the chip deflector 64 protrudes much further, relative to the major cutting edge 52, than it does in the region of the leading section 66, which can affect the development of the chips.

Figure 6:
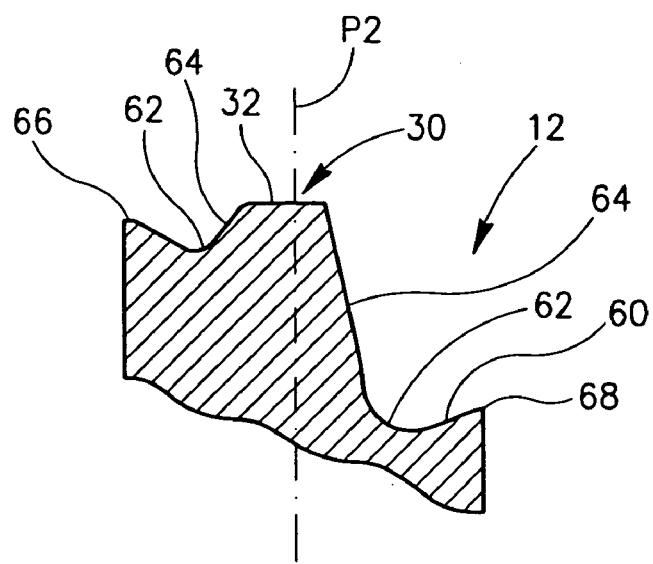
FIG. 6 is a cross-sectional view of the cutting insert shown in FIGS. 1A and 1B, taken along the line VI—VI in FIG. 4.
Figure 7:
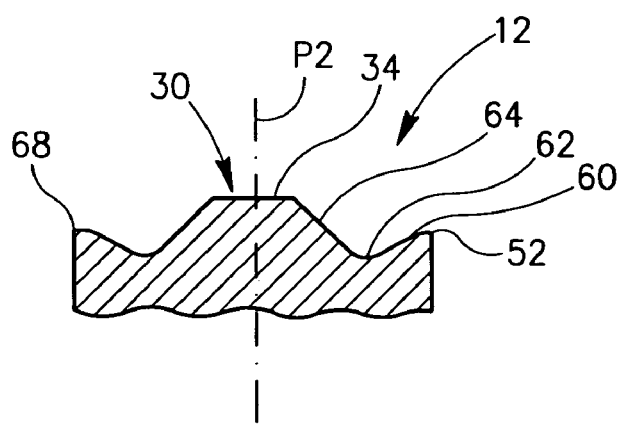
FIG. 7 is a cross-sectional view of the cutting insert shown in FIGS. 1A and 1B, taken along the line VII—VII in FIG. 4.
Figure 8:
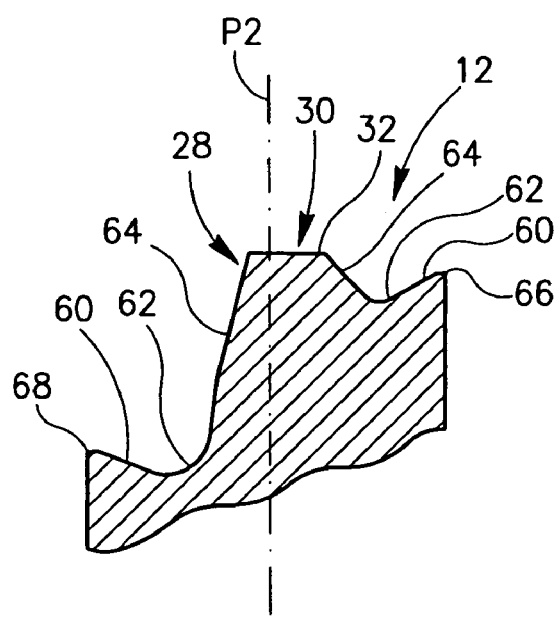
FIG. 8 is a is a cross-sectional view of the cutting insert shown in FIGS. 1A and 1B, taken along the line VIII—VIII in FIG. 4.

In order to reduce the influence of the protruding chip deflector 64 in the region of the trailing section 68, the chip deflector 64 is designed to be further from the major cutting edge 52 in the region of the trailing section 68 than it is in the region of the leading section 66. Consequently, as can be seen in FIG. 4, in an end-view of the cutting insert 10, the shape of the projecting abutment member 28, and consequently of the projecting abutment surface 30, has a generally elongated "S" shape. Each outer flat portion 32 of the projecting abutment surface 30 is bounded by two parallel long edges 36 extending between two short edges 38. Therefore, each outer flat portion 32 of the projecting abutment surface 30 extends from a respective short edge 38 to the inner flat portion 34. Each of the two outer flat portions 32 has a median line L1, L2 that is parallel to, but offset from, the major plane P2. One median line L1 being offset to one side of the major plane P2 and the other median line L2 being offset to the other side of the major plane P2, with the inner flat portion 34 being transverse to the major plane P2. Clearly then, in an end view of the cutting insert 10, as can be seen in FIG. 4, the median lines L1, L2 of the two outer flat portions 32 are parallel, non-adjacent, and spaced apart from each other. In other words, the median lines L1, L2 of the two outer flat portions 32 are parallel, do not overlap, and do not lie on a common straight line. Because of this structure, the distance between the chip deflector 64 and the adjacent major cutting edge 52 remains constant along each outer flat portion 32. This is advantageous in regions where the chip deflector 64 projects high above the adjacent major cutting edge 52 as shown on the right hand side in FIG. 6, and the left hand side in FIG. 8.

Although the shape of the major cutting edge 52 is shown to be generally straight, it can have any desired shape, as long as it generally slopes downwardly from the raised corner 24 to the lowered corner 26, as shown in FIG. 2. With reference to FIG. 5, it can be seen that in a minor side view of the cutting insert 10 (i.e., a side view of the minor side surfaces, 16) the minor edge 44 is clearly divided into two sections, a first section 48a, associated with the long side surface 70a, extending from the raised corner 24 to approximately the major plane P2 and a second section 48b, associated with the short side surface 70b, extending from the major plane P2 to the lowered corner 26. The first section 48a is approximately straight and is substantially perpendicular to the major side surface 18 in a major side view (see FIG. 5) and is oriented at the angle α with respect to the plane P3 in an end view (see FIG. 4). The second section 48b extends from approximately the major plane P2 slopingly towards the lowered corner 26 in a minor side view, (see FIG. 5) and is oriented at the angle α with respect to a plane P3 in an end view (see FIG. 4). It is the first section 48a of the minor edge 44 that forms the minor cutting edge 54. In accordance with a specific application, the angle α is approximately 1.5°.

Figure 9:
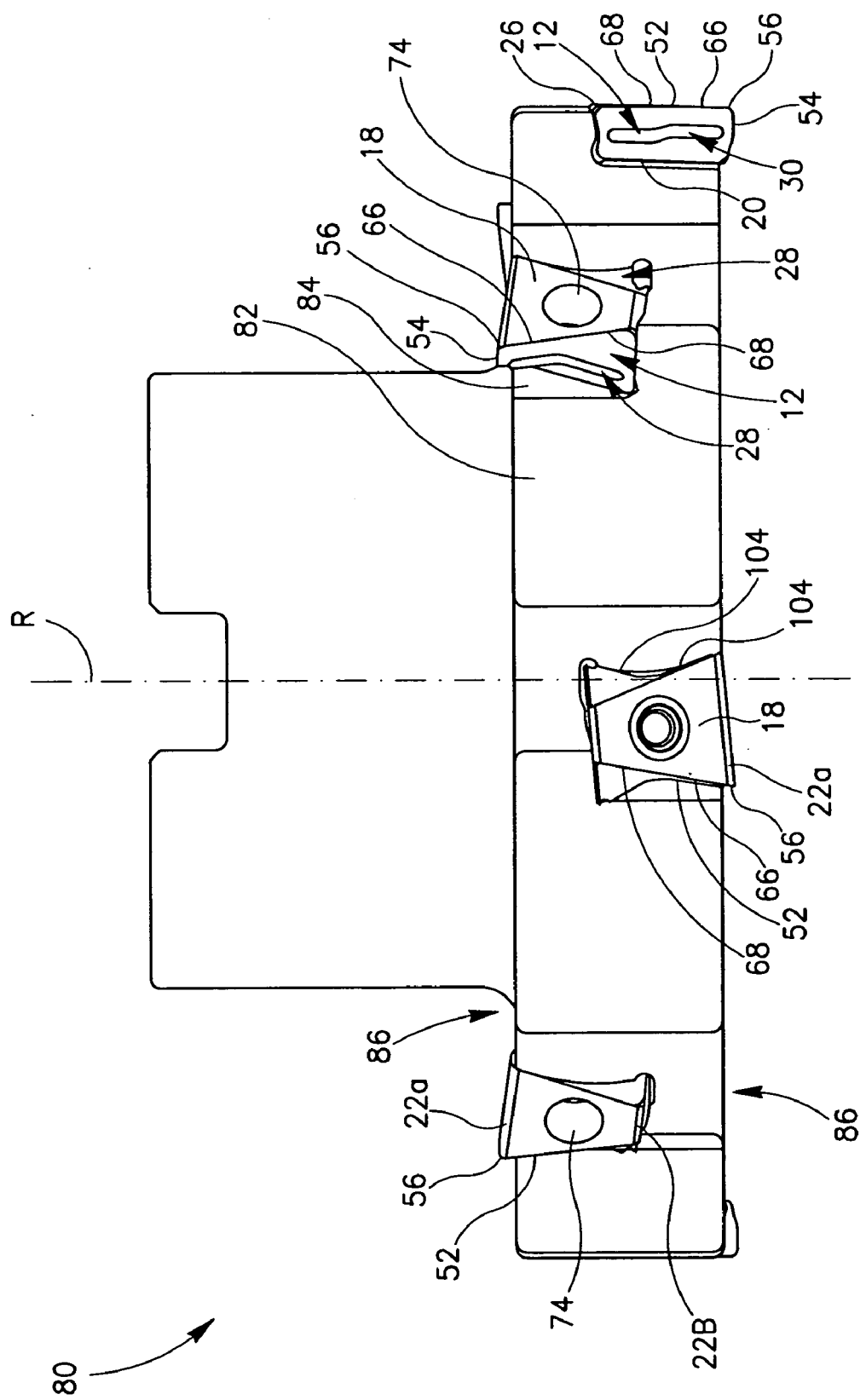
FIG. 9 is a side view of the milling cutter in accordance with the present invention.

Attention is now drawn to FIG. 9, showing a milling cutter 80 with an axis of rotation R, having a cutter body 82 provided with a plurality of insert pockets 84. The particular milling cutter shown is a slotting cutter, which exemplifies one of the advantages of the cutting insert 10 in accordance with the present invention. Although such a milling cutter requires both "right-hand" and "left-hand" cutting inserts, a single cutting insert is used since the cutting insert 10 is both right and left handed. Each cutting insert 10 is seated in the cutter body 82 with an axial rake angle generally in the range of 5° to 20° and is secured to the insert pocket 84 by means of a clamping screw (not shown). Each cutting insert is seated so that there will be a clearance between a workpiece (not shown) and the cutting insert's minor side surface 16 adjacent an axial face 86 of the milling cutter.

Figure 10:
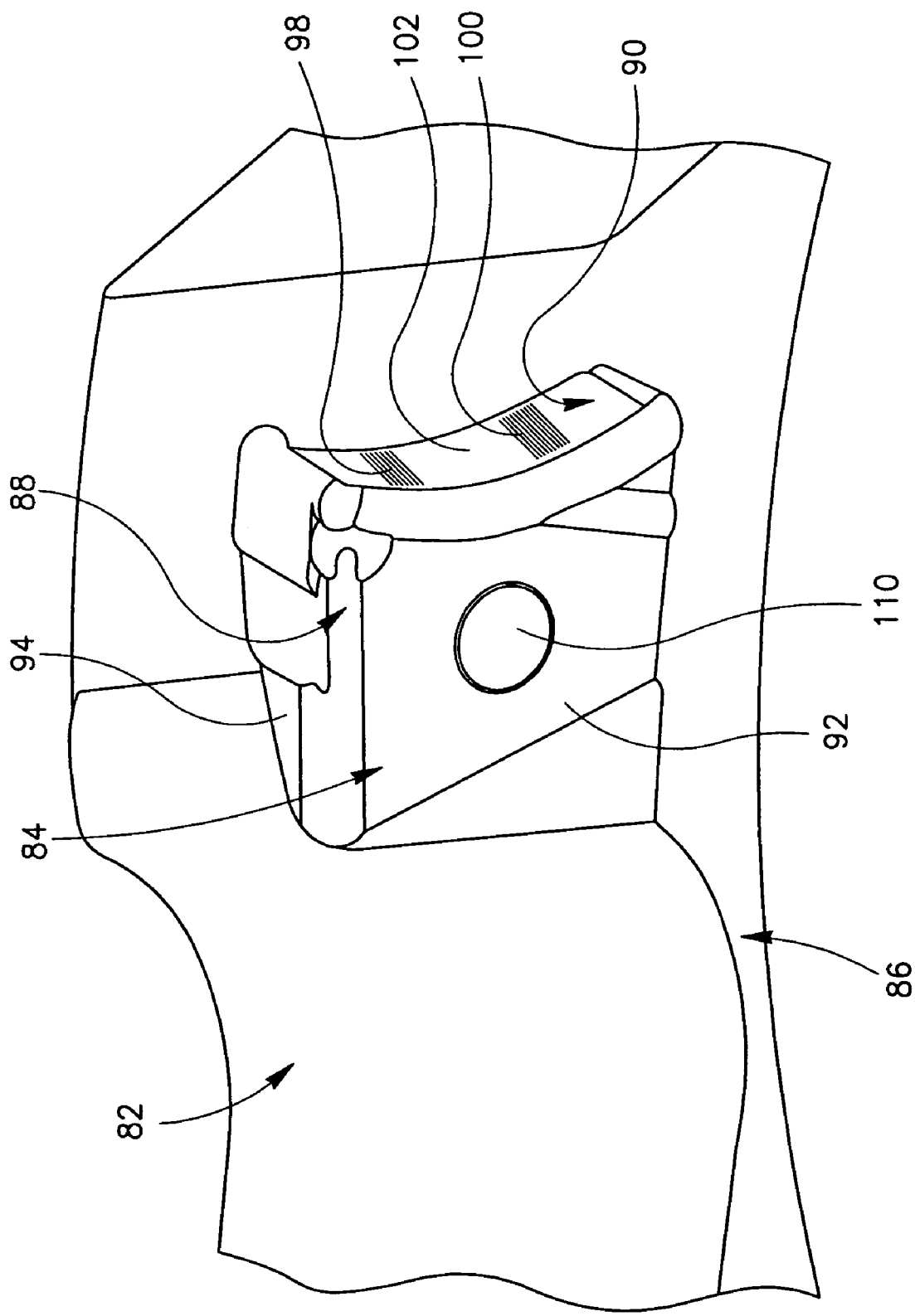
FIG. 10 is a perspective view of a portion of the cutter body of the milling cutter shown in FIG. 9, showing in detail an insert pocket.
Figure 11:
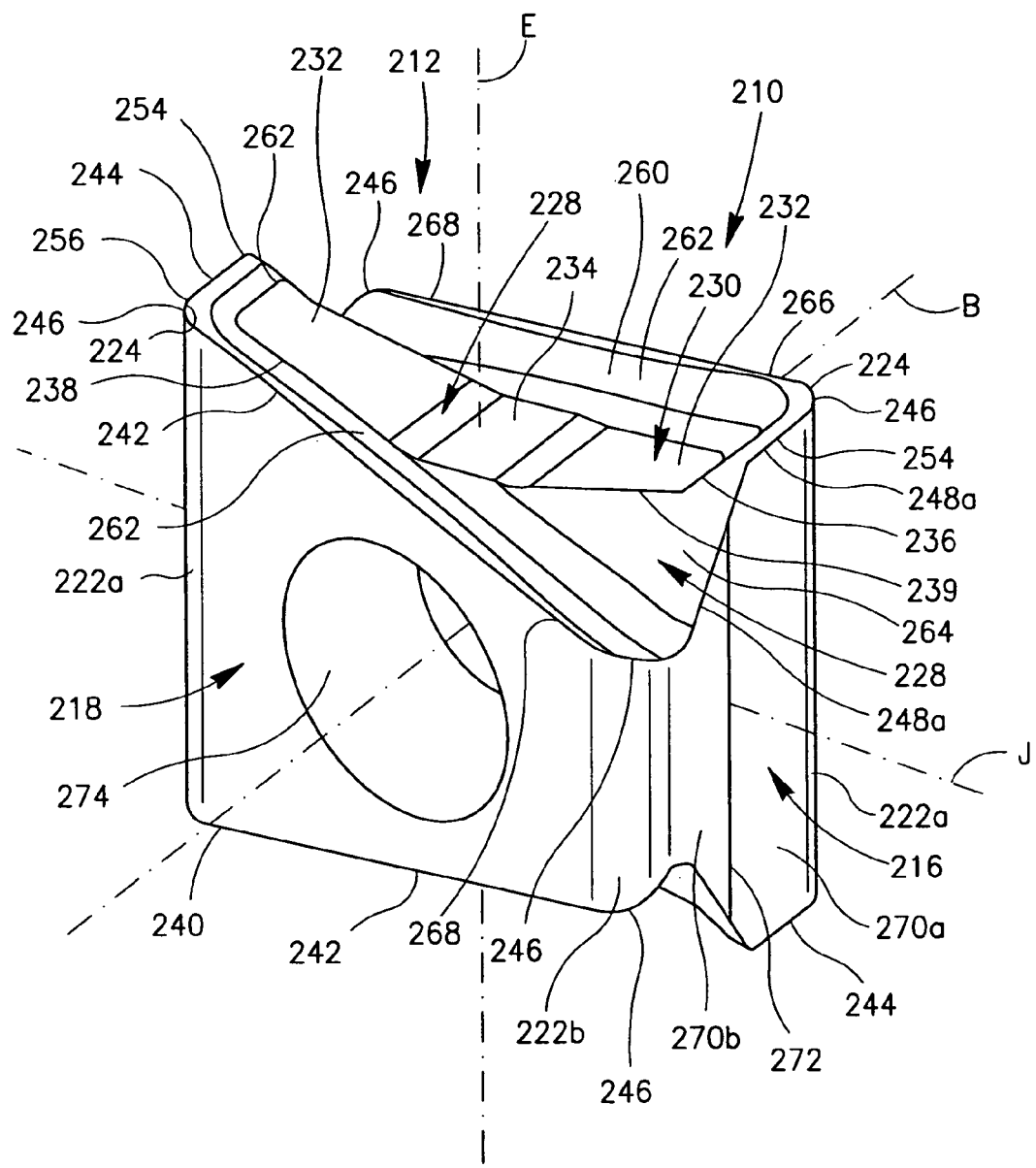
FIG. 11 is a perspective view of a cutting insert in accordance with a second embodiment of the present invention.

The structure of the insert pocket 84 is shown in detail in FIG. 10. The insert pocket 84 comprises adjacent axial and rear walls 88, 90 generally transverse to a base 92. The rear wall 90 is generally convex and the axial wall 88 is provided with an axial location surface 94 for abutting the short side surface 70b of a given minor side surface 16 of the cutting insert 10 at an axial abutment region 96. The rear wall 90 is provided with two tangential location surfaces, an upper tangential location surface 98, adjacent the axial wall 88 of the insert pocket 84, and a lower tangential location surface 100 adjacent the milling cutter's axial face 86. The two tangential location surfaces 98, 100 project outwardly from the rear wall 90 and are located on either side of a central region 102 of the rear wall 90, which is correspondingly recessed relative to the tangential location surfaces 98, 100. The upper tangential location surface 98 abuts one of two tangential abutment surfaces 104 located on one of the two outer surfaces 32 of a given abutment surface 30. Similarly, the lower tangential location surface 100 abuts the other one of the two tangential abutment surfaces 104 located on the other of the two outer surfaces 32 of the given abutment surface 30.

The axial abutment region 96 is located on a short side surface 70b which is the radially outer minor side sub-surface of the minor side surface 16. Each short side surface 70b is provided with two axial abutment regions 96 adjacent the lowered corners 26 (see FIG. 5), one for right-handed operations and the other for left-handed operations. The base 92 of the insert pocket 84 is provided with a threaded bore 110 for receiving the clamping screw. When the cutting insert 10 is secured in the insert pocket 84, a radially inner major side surface 20 will abut the base 92 of the insert pocket 84. The major side surfaces 18 and the minor side sub-surfaces 70a, 70b are preferably ground to ensure good positioning of the cutting insert 10 in the insert pocket 84.

While the cutting insert 10 was described as having the projecting abutment member 28 shaped as an elongated, or stretched out, "S-shape", clearly other variations in the shape of the projecting abutment member 28 and of the abutment surface 30 are acceptable in accordance with the present invention, provided that in a major side view, as in FIG. 2, the abutment surface 30 is concave, and the rear wall 90 of the insert pocket 84 is designed to be correspondingly convex, with two protruding tangential location surfaces 98, 100, in order to abut the concave abutment surface 30.

FIGS. 11 to 18 show an indexable tangential cutting insert 210 in accordance with a second embodiment of the present invention, having axes (B, E and J) and planes (P1, P2, P3 and M) defined in the same manner as with respect to the cutting insert 10 of the first embodiment of the present invention. Since the cutting insert 210 in accordance with the second embodiment has many features which are similar to those of the cutting insert 10 in accordance with the first embodiment, the similar features will simply be referred to herein below, by reference numerals which are shifted by 200 from those of the cutting insert 10 in accordance with the first embodiment.

A peripheral side surface 214 extends between the two opposing end surfaces 212 of the cutting insert 210 and comprises two opposed identical minor side surfaces 216, two opposed identical major side surfaces 218, two diagonally opposite long corner side surfaces 222a, and two diagonally opposite short corner side surfaces 222b. Adjacent minor and major side surfaces 216, 218 merge at a common corner side surface 222a, 222b. Each end surface 212 has four corners, two diagonally opposite raised corners 224 and two diagonally opposite lowered corners 226, the lowered corners 226 being closer to the median plane M than the raised corners 224. Each of the long corner side surfaces 222a extends between a given raised corner 224 of one of the two opposing end surfaces 212 and an opposing raised corner 224 of the other of the two opposing end surfaces 212. Similarly, each of the short corner side surfaces 222b extends between a given lowered corner 226 of one of the two opposing end surfaces 212 and an opposing lowered corner 226 of the other of the two opposing end surfaces 212.

Figure 12:
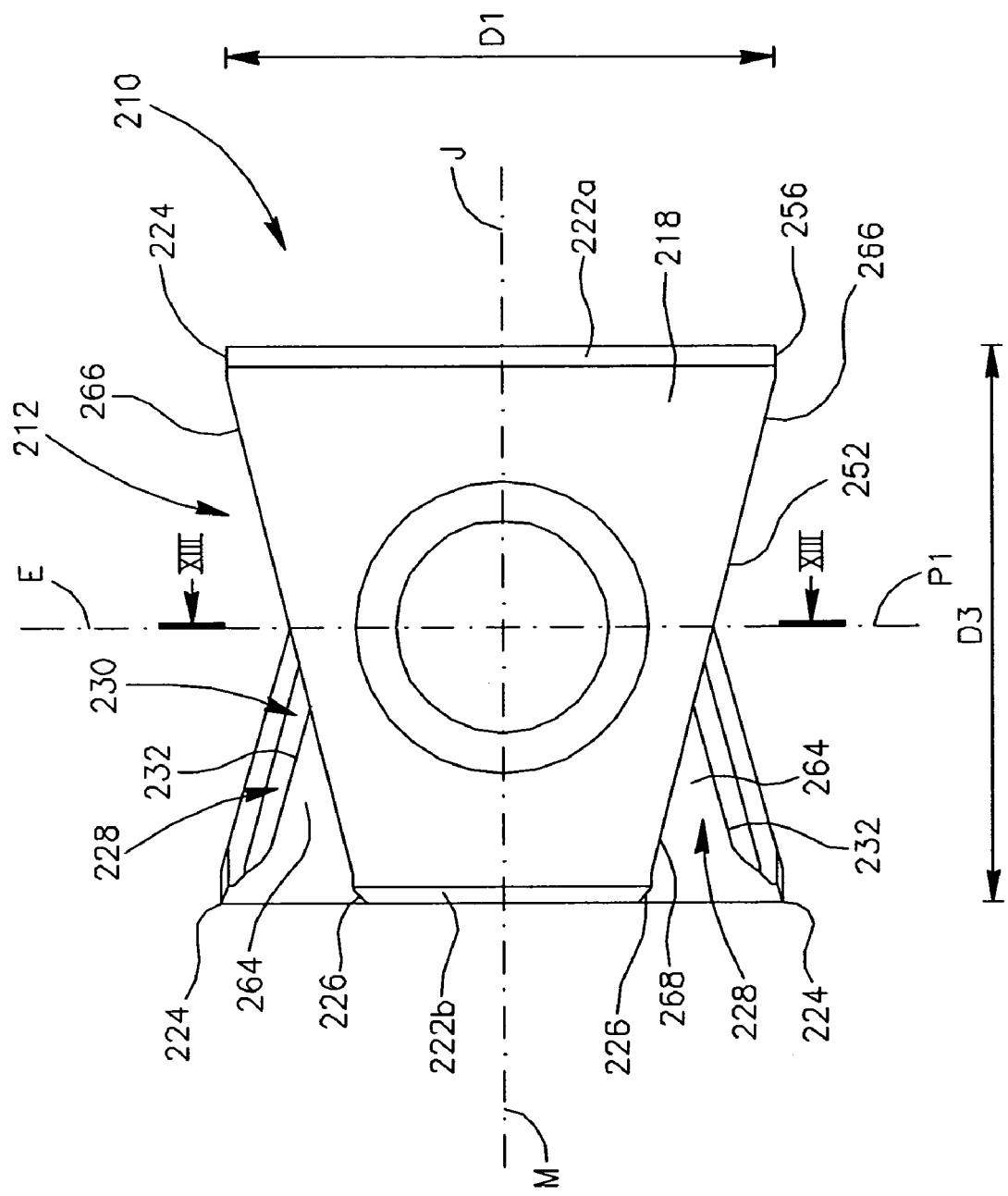
FIG. 12 is a major side view of the cutting insert shown in FIG. 11.
Figure 13:
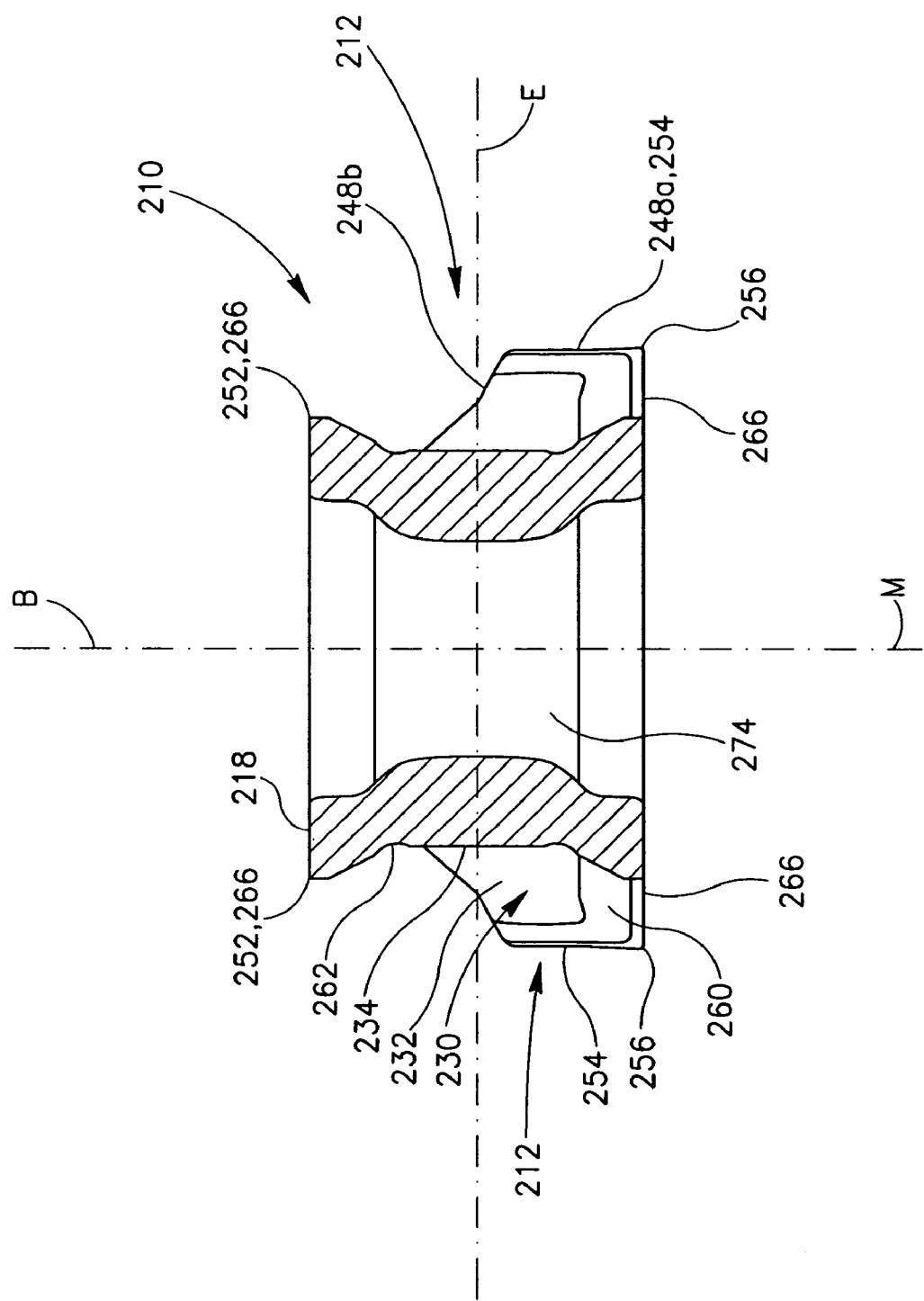
FIG. 13 is a cross sectional view of the cutting insert shown in FIG. 11, taken along the line XIII—XIII in FIG. 12.

A peripheral edge 240 is formed at the intersection of each end surface 212 and the peripheral side surface 214. The peripheral edge 240 comprises two major edges 242, formed by the intersection of the major side surfaces 218 with the end surface 212; two minor edges 244, formed by the intersection of the minor side surfaces 216 with the end surface 212; and four corner edges 246, formed by the intersection of either of the long or short corner side surfaces 222a, 222b with the end surface 212. As can be seen in FIG. 12, in a major side view of the cutting insert 210, the major side surface 218 has a general isosceles trapezoidal shape bounded by an opposing pair of major edges 242 and opposing parallel long and short corner side surfaces 222a, 222b.

At least two sections of each peripheral edge 240 of the cutting insert 210 constitute cutting edges 250. Each cutting edge 250 comprises a major cutting edge 252, extending along substantially the whole length of its associated major edge 242; a minor cutting edge 254, extending along at least half of the length of its associated minor edge 244; and a corner cutting edge 256, associated with a raised corner 224 and at which the major and minor cutting edges 252, 254 merge.

Figure 14:
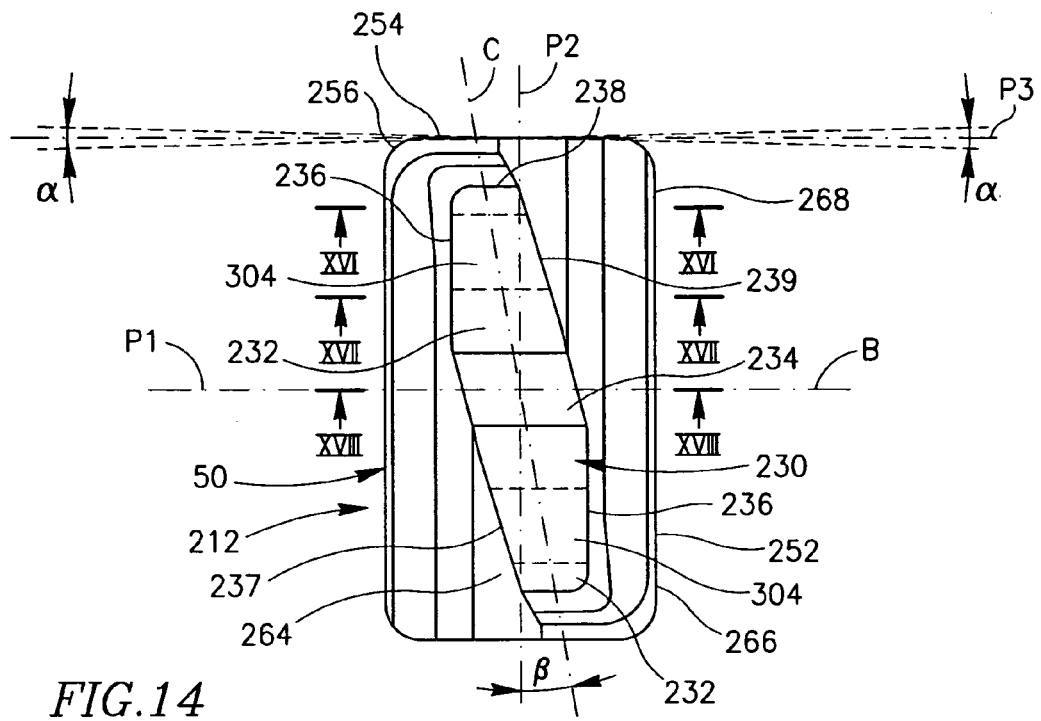
FIG. 14 is an end view of the cutting insert shown in FIG. 11.
Figure 15:
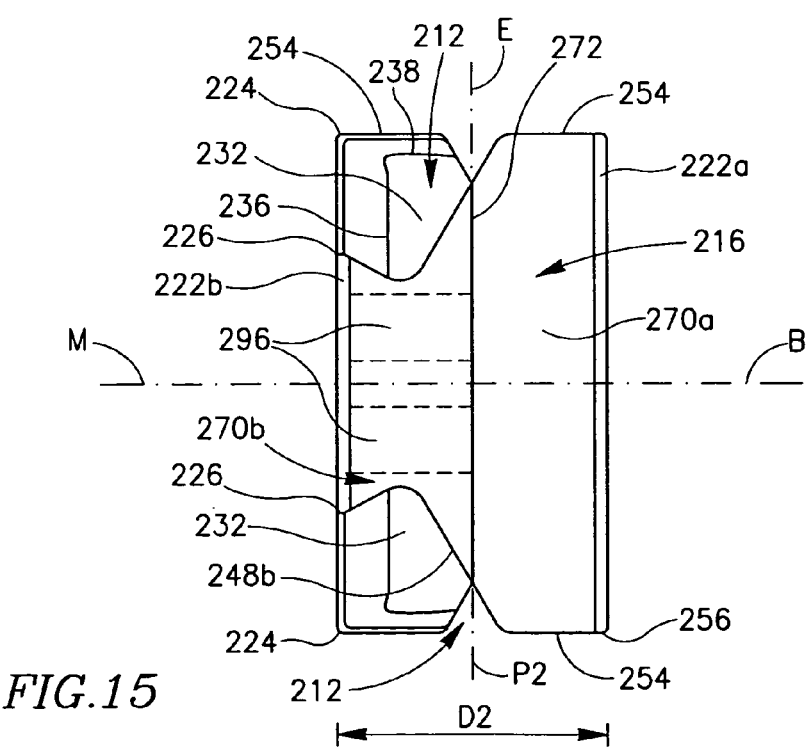
FIG. 15 is a minor side view of the cutting insert shown in FIG. 11.

FIG. 14 shows an end view of the second embodiment of the cutting insert, in which a particular end surface 212 is seen, comprising two parallel major cutting edges 252. Disposed between the two major cutting edges 252 is an abutment member 228 having an abutment surface 230. The abutment surface 230 comprises three generally flat portions, two outer flat portions 232 with an inner flat portion 234 therebetween. Each outer flat portion 232 of the abutment surface 230 is bounded on one side by a parallel long edge 236 which is essentially parallel to, and adjacent a leading section 266 of the major cutting edge 252. The leading section 266 extends along the major cutting edge 252 away from the corner cutting edge 256 to at least beyond the minor plane P1, the remaining length of the cutting edge 252 constitutes a trailing section 268. A chip deflector 264 protrudes in a major side view (FIG. 12) above the trailing section 268 of the major cutting edge 252. The chip deflector 264 and its associated outer flat portion 232 of the abutment surface 230 meet at a diagonal edge 237 which bounds the outer flat portion 232 on an opposite side to the parallel long edge 236, the diagonal edge 237 being adjacent to the trailing section 268 of the major cutting edge 252. Each outer flat portion 232 of the abutment surface 230 is additionally bounded by the inner flat portion 234 of the abutment surface 230, and by a short edge 238 which is parallel to a minor cutting edge 254 of the cutting insert 210. Each abutment surface 230 lies on a concave surface S which is generally V-shaped in form, thereby minimizing any disturbance to chip development during a milling process. Moreover, as opposed to the cutting insert 10 in accordance with the first embodiment, in major side views of the cutting insert 210 in accordance with the second embodiment, the abutment surface 230 does not project above the leading section 266 of the major cutting edge 252 (see FIG. 12), which further reduces disturbances to chip development.

Figure 16:
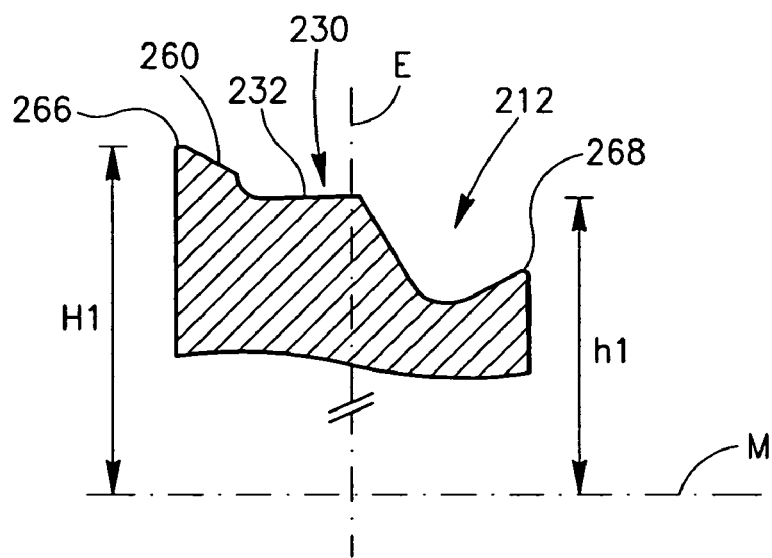
FIG. 16 is a cross-sectional view of the cutting insert shown in FIG. 11, taken along the line XVI—XVI in FIG. 14.
Figure 17:
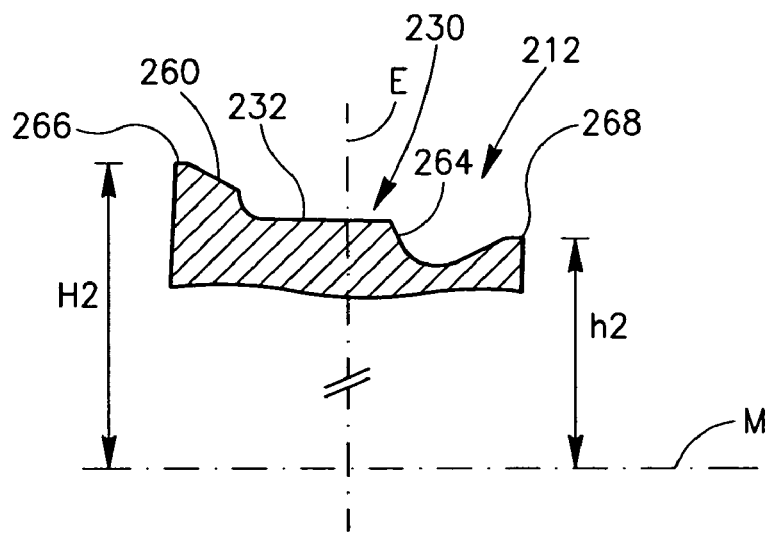
FIG. 17 is a cross-sectional view of the cutting insert shown in FIG. 11, taken along the line XVII—XVII in FIG. 14.
Figure 18:
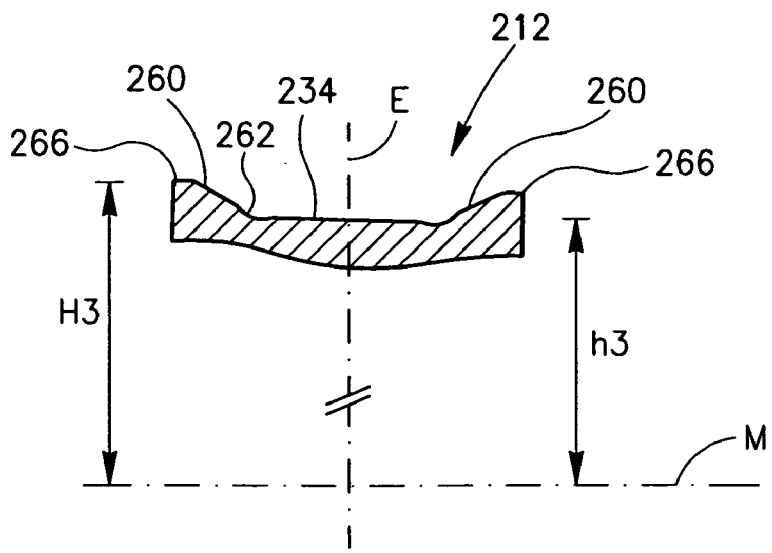
FIG. 18 is a cross-sectional view of the cutting insert shown in FIG. 11, taken along the line XVIII—XVIII in FIG. 14.

Referring now to FIGS. 16, 17, and 18 it is seen that in each cross section of the cutting insert taken in a plane parallel to the minor plane P1 of the cutting insert 210, the abutment surface 230 of a particular end surface 212 is closer to the median plane M than a leading section 266 of one of the major cutting edges 252 of the particular end surface 212. For example, in the cross section shown in FIG. 16, the leading section 266 of the major cutting edge 252 to the left of the figure, is located at a distance H1 from the median plane M, whereas, the respective abutment surface 230 is located at a distance h1, where H1 is greater than h1. Similarly, in the cross section shown in FIG. 17, the leading section 266 of the major cutting edge 252 is located at a distance H2 from the median plane M, whereas, the abutment surface 230 is located at a distance h2, where H2 is greater than h2. Similarly, in the cross section shown in FIG. 17, taken at the location of the minor plane P1, the leading section 266 of the major cutting edge 252 is located at a distance H3 from the median plane M, whereas, the abutment surface 30 is located at a distance h3, where H3 is greater than h3. In other words, the abutment member 228 in the region of the leading section 266 of the major cutting edge 252 and up to, and a little beyond the minor plane P1 (as can be seen in FIG. 12), does not protrude above the major cutting edge 252. As a consequence, chips cut from a workpiece in the region leading section 266 of the major cutting edge 252 are well formed during a milling process. However, in the region of the trailing section 268 of the major cutting edge 252, the chip deflector 264 protrudes above the major cutting edge 252 (as can be seen in FIG. 12 and on the right hand side of FIGS. 16 and 17), which can disturb the development of the chips.

In order to reduce the influence of the chip deflector 264 in the region of the trailing section 268, the abutment member 228 is designed to be more distant from the major cutting edge 252 in the region of the trailing section 268 than it is in the region of the leading section 266. Consequently, in an end view of the cutting insert 210, a longitudinal axis C of the abutment member 228 makes an acute angle β with the major plane P2.

The cutting insert 210 in accordance with the second embodiment is seated in the milling cutter body 82 in much the same way as cutting insert 10 in accordance with the first embodiment, wherein two outwardly projecting tangential location surfaces 98, 100 of the rear wall 90 of the insert pocket 84 abut two tangential abutment surfaces 304 located on the outer surfaces 232 of the abutment surface 230, and an axial abutment region 296 located on a radially outer short side surface 270*b* of the minor side surface 216 abuts the axial location surface 94 in the insert pocket 84 on the cutter tool body 82. The abutment surfaces 304, and the axial abutment region 296, of the cutting insert 210 can be seen in FIGS. 14 and 15, respectively.

Although the present invention has been described to a certain degree of particularity, it should be understood that various alterations and modifications could be made without departing from the scope of the invention as hereinafter claimed.

The invention claimed is:

1. A tangential cutting insert comprising:
   two identical opposing end surfaces having a generally rectangular shape in an end view of the cutting insert,
   a peripheral side surface extending between the two opposing end surfaces, and
   a peripheral edge formed at the intersection of each end surface and the peripheral side surface, at least two sections of each peripheral edge constituting cutting edges,
   the peripheral side surface comprising:
   two opposing major side surfaces having a generally isosceles trapezoidal shape in major side views of the cutting insert,
   each end surface having four corners, two diagonally opposite raised corners and two diagonally opposite lowered corners, the lowered corners being closer to a median plane M of the cutting insert than the raised corners,
   the median plane M passing between the two opposing end surfaces of the cutting insert,
   each end surface being provided with an abutment surface.

2. The cutting insert according to claim 1, wherein the peripheral side surface comprises two opposing minor side surfaces, generally traverse to the major side surfaces and to the end surfaces, each minor side surface having a general shape of a rectangle with two truncated corners in a minor side view of the cutting insert.

3. The cutting insert according to claim 2, wherein the cutting insert is mirror symmetric with respect to the median plane M.

4. The cutting insert according to claim 3, wherein in a side view of either major side surface, the abutment surface is generally V-shaped.

5. The cutting insert according to claim 3, wherein in a side view of either major side surface the abutment surface lies on a concave surface S.

6. The cutting insert according to claim 5, wherein the abutment surface comprises three flat portions, two outer flat portions with an inner flat portion therebetween.

7. The cutting insert according to claim 6, wherein in an end-view of the cutting insert two median lines (L1, L2) are defined, one for each outer flat portion, the median lines (L1, L2) do not overlap and do not lie on a common straight line.

8. The cutting insert according to claim 7, wherein the two median lines (L1, L2) are parallel.

9. The cutting insert according to claim 8, wherein the two median lines (L1, L2) are parallel to the major side surfaces.

10. The cutting insert according to claim 6, wherein in an end view of the cutting insert the abutment surface has an elongated S-shape.

11. The cutting insert according to claim 1, wherein each cutting edge comprises a major cutting edge, a minor cutting edge and a corner cutting edge, therebetween.

12. The cutting insert according to claim 11, wherein major, minor, and corner edges are formed at the intersection of the major side surfaces, minor side surfaces and long corner side surfaces, respectively, with each end surface.

13. The cutting insert according to claim 11, wherein each corner cutting edge is associated with a given raised corner.

14. The cutting insert according to claim 11, wherein each major cutting edge extends along substantially the whole length of an associated major edge.

15. The cutting insert according to claim 11, wherein each minor cutting edge extends along at least half of the length of an associated minor edge.

16. The cutting insert according to claim 1, wherein in each cross section of the cutting insert taken in a plane perpendicular to the median plane M of the cutting insert, the abutment surface of a particular end surface is closer to the median plane M than a leading section of one of the major cutting edges of the particular end surface.

17. The cutting insert according to claim 16, wherein major, minor, and corner edges are formed at the intersection of the major side surfaces, minor side surfaces and long corner side surfaces, respectively, with each end surface.

18. The cutting insert according to claim 16, wherein each corner cutting edge is associated with each raised corner.

19. A milling cutter comprising:
at least one cutting insert of claim 1; and
a cutter body having at least one insert pocket in which the at least one cutting insert is retained;
the at least one insert pocket comprising adjacent side and rear walls generally transverse to a base, the rear wall being generally convex;
the side wall being provided with an axial location surface that abuts a given minor side surface of the at least one cutting insert at a given axial abutment region;
the rear wall being provided with two tangential location surfaces, located on either side of a central region of the rear wall;
a first of the two tangential location surfaces abuts one of the two tangential abutment surfaces, a second of the two tangential location surfaces abuts the other one of the two tangential abutment surfaces, located on the abutment surface of the at least one cutting insert.

20. The milling cutter according to claim 19, wherein the given axial abutment region is located on a forward region of a radially outer short side surface of a given minor side surface, the forward region being distal the rear wall of the insert pocket.

* * * * *